April 26, 1966  R. P. SMITH  3,247,547
WIRE GUIDE FOR EXTRUDING MACHINES
Filed April 3, 1963

United States Patent Office 3,247,547
Patented Apr. 26, 1966

3,247,547
WIRE GUIDE FOR EXTRUDING MACHINES
Robert P. Smith, East Haven, Conn., assignor to Heany Industrial Ceramic Corporation, New Haven, Conn., a corporation of New York
Filed Apr. 3, 1963, Ser. No. 270,306
3 Claims. (Cl. 18—13)

This invention relates to a wire guide for guiding wire as it passes through an extruding machine for the purpose of having a coating applied thereto. The coating may be of any suitable known material such as a rubber composition or a plastic material, and may be applied to the wire for various purposes, usually for the purpose of providing an insulating covering over the metallic wire. The extruding machine itself is well known in the art and need not be disclosed in detail, as the present invention relates only to the construction of the wire guide which guides the wire at the point of application of the coating, to insure that the wire is properly centered with respect to the surrounding coating.

An object of the invention is the provision of a generally improved and more satisfactory wire guide for this purpose.

Another object is the provision of a wire guide in which the part in contact with the moving wire is of ceramic material, and in which the ceramic material is so designed and constructed as to eliminate chipping and breakage, which has been troublesome in other wire guides using ceramic parts.

Figure 1:
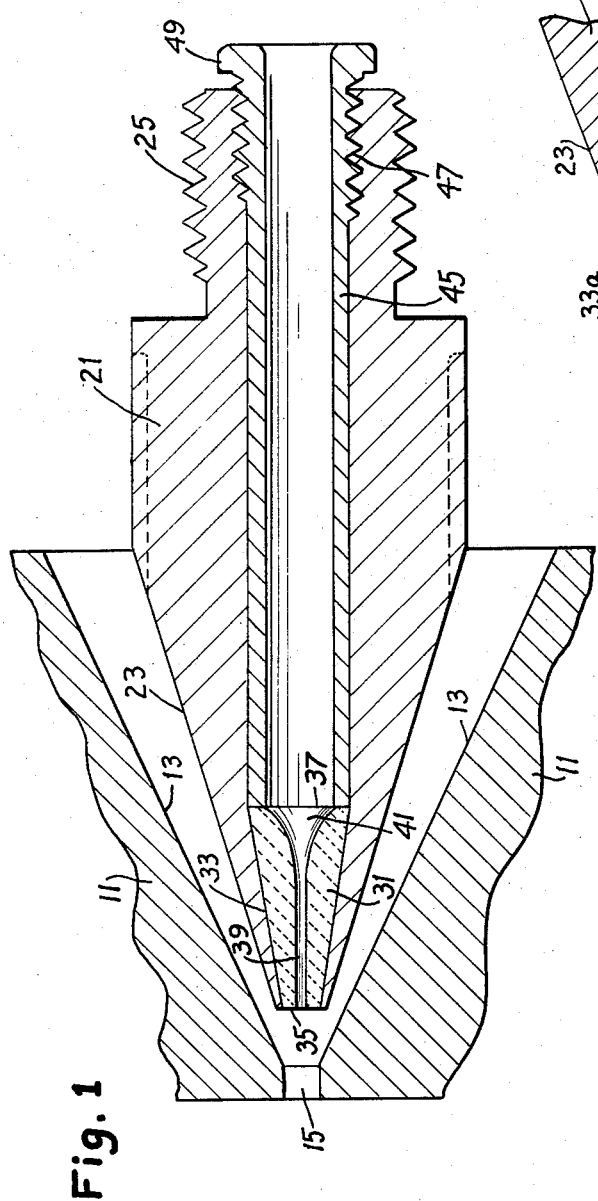
Figure 2:
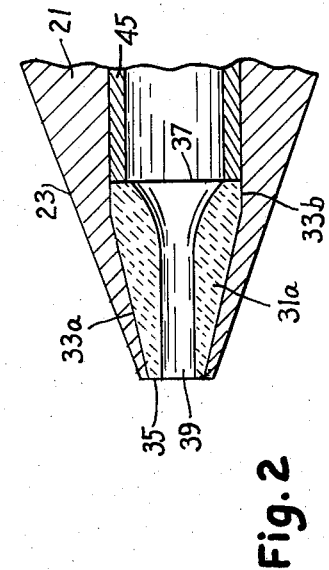

These and other desirable objects may be attained in the manner disclosed as an illustrative embodiment of the invention in the following description and in the accompanying drawing forming a part hereof, in which:

FIG. 1 is a longitudinal section taken centrally through a wire guide assembly in accordance with the present invention, on an enlarged scale; and FIG. 2 is a fragmentary view of a similar section through an alternative construction.

The usual extrusion nozzle as used with a conventional extrusion machine comprises an outer nozzle member 11 having the usual frusto-conical opening 13 terminating at its forward end in a short cylindrical section 15 which determines the external diameter of the extruded product, such as the insulating covering on a wire. Placed within the conical portion 13 is the wire guide for guiding the wire into a central position with respect to the extrusion orifice 15. This wire guide comprises a metal body 21 having its forward portion formed with a frusto-conical outer surface 23 and having its rear portion formed with external screw threads 25 by which the body is rigidly mounted in a suitable rigid support in the extrusion machine. An opening extends longitudinally through the entire wire guide body, and the wire to be coated travels longitudinally through this opening, being guided against lateral deflection as it emerges from the forward end of the wire guide body, which is the left hand end when viewed as in the drawing.

In most wire guides as heretofore used, the portion of the wire guide which makes contact with the wire as the latter emerges from the front end of the guide, has been of metal, such as steel. This wears rapidly under the influence of the continuous travel of the wire through the mechanism, so that after an interval of use, the orifice through which the wire emerges is worn to a larger size than the diameter of the wire, thereby allowing the wire to be deflected from the central position which it should occupy, so that the insulating coating extruded onto the wire may be thicker on one side of the wire than on the other side.

Attempts have been made to remedy this by using harder material at the orifice of the wire guide, so that the harder material would wear more slowly and retain its intended dimensions for a longer period of use. However, when attempts have been made to use wear-resistant ceramic material at the orifice, great difficulty has been encountered in chipping or breaking of the ceramic material. The present invention overcomes these former difficulties and enables wear-resistant ceramic material to be used at the orifice, in a form and shape which does not break or chip during long-continued normal use.

The wear-resistant ceramic member according to the present invention is in the form of a ceramic body 31 having a smooth outer surface 33 which is frusto-conical throughout all or at least the major portion of its length, the ceramic body also having a front end 35, and a rear end 37, the end surfaces being squared off in planes parallel to each other and perpendicular to the axis of the cone. In some sizes of the ceramic body, the frusto-conical surface 33 extends completely and smoothly from the front end 35 to the rear end 37, without any shoulders, depressions, flanges, or other irregularities of any kind. In other sizes, there may be a short cylindrical surface at the rear or larger end of the frusto-conical surface, as further explained below. A bore 39 extends longitudinally through the center of this ceramic member; that is, extends along the axis of the cone. The rear end portion of the bore is flared as at 41, for easier entrance of the wire, especially when a fresh piece of wire is threaded into the mechanism. The remainder of the length of the bore 39 (about two-thirds of the length) is of uniform diameter, right up to the front end 35, the diameter of the bore corresponding closely to the diameter of the wire which is to be drawn through the guide, with such degree of tolerance as represents the conventional practice in the art.

It will be noted that the opening extending longitudinally through the metal body 21 is formed at its forward end of frusto-conical shape mating with the external frusto-conical surface 33 of the ceramic member 31. From the rear end of the frusto-conical interior shape of the metal body 21, the central opening thence extends rearwardly in a cylindrical shape, except at the extreme rear end where there are screw threads as further mentioned below. In this cylindrical portion there is a metal sleeve or tube 45, the front end of which presses firmly against the rear end 37 of the ceramic guide 31, to hold the ceramic guide in place. Near its rear end, the sleeve 45 has external screw threads 47 which are screwed into internal threads at the rear end of the member 21. At the extreme rear end of the sleeve 45 is an enlargement 49 externally shaped like a nut (e.g., hexagonal) so that a wrench may engage this nut portion 49 to turn the sleeve 45 to tighten or loosen it.

In operation, the wire to be coated moves longitudinally along the central opening through the assembly, in a direction from right to left when viewed as in the drawing, and as the wire emerges from the forward or left end of the ceramic guide member 31, it is met by the coating material which is injected in a plastic state into the space between the external nozzle body 11 and the guide body 21, in conventional manner well known in the art. The wire with the coating around it then continues leftwardly and issues through the injection orifice 15 in the conventional manner.

It will be noted that the forward end 35 of the ceramic guide 31 is flush with the forward end of the metal body 21 in which it is mounted, and thus is as close as possible to the point where the coating material is applied to the wire. Also it will be noted that throughout the entire length of the exterior frusto-conical surface 33 of the ceramic body, said frusto-conical surfaces mates completely and smoothly with a corresponding internal frusto-conical surface of the metal body 21, with no flanges or abutments which can chip or break. The metal sleeve 45 presses directly against the rear end 37 of the ceramic guide member, and it is found in practice that with the construction here described, it is not necessary to interpose any resilient washer or soft washer between the metal sleeve and the ceramic body. With no flanges or projections to chip or break, and with the ceramic body so completely and tightly encompassed and embraced by the metal parts of the body, breakage such as has occurred in the prior art does not occur here.

The ceramic guide body 31 can be made of hard-wear resistant ceramic material having an extremely long life. When it finally does wear beyond the permissible extent, it is a comparatively easy matter to remove the ceramic body and replace it. The tubular metal sleeve 45 is unscrewed and removed, after which a suitable pushing tool is inserted through the orifice 15 of the extrusion nozzle, pushing rearwardly to dislodge the ceramic body 31 and push it rearwardly out the rear end of the metal body or holder 21. A new ceramic body is inserted in the rear of the metal holder, is pushed forwardly by re-insertion of the tubular sleeve 45, and the parts are again ready for immediate operation.

Merely as a typical example of suitable dimensions, and without being intended as a limitation, the following figures may be mentioned. In a guide intended for wire having a diameter of 0.033 of an inch, it has been found satisfactory to make the ceramic body ⅜ of an inch long, and to make the front or smaller end with a diameter of ¹⁄₁₆ of an inch. In this typical size, the cone angle of the external surface 33 is a total angle of 18 degrees, that is, 9 degrees on either side of the central axis. The frusto-conical face 23 of the metal holder or body 21 has a total cone angle of 34 degrees, or 17 degrees on each side of the central axis, and the front end of the body 21 has an internal diameter the same as the external diameter of the ceramic body 31, and an external diameter of ³⁄₃₂ of an inch, so that the metal around the ceramic body, at the extreme front end thereof, has a radial thickness of ¹⁄₆₄ of an inch. The cylindrical part of the bore through the metal body 21, rearwardly of the frusto-conical part, has an internal diameter of ³⁄₁₆ of an inch.

Of course the dimensions may be varied according to the size of the wire which is to be guided by the ceramic insert, and may be varied not only in the size of the wire guide opening or bore 39, but in other dimensions also. Conveniently, for the sake of economy of manufacture of the ceramic guides or inserts, they are all preferably made with an axial length of about ⅜ of an inch regardless of variations in the other dimensions.

The dimensions given above as a typical example are those of the exemplary embodiment illustrated in FIG. 1, which is here shown on a scale of about four times actual size. To mention other examples, the cone angle of the outer face 33 of the ceramic member may be increased, if desired, from the above-mentioned figure of 18 degrees (total angle) to 28 degrees or any intermediate figure. The outside diameter of the large end of the ceramic member may be, say ¼ of an inch, if it is desired to have an outside diameter slightly larger than the ³⁄₁₆ inch mentioned in the first example, the front end or small end of the ceramic member preferably has an outside diameter at least 0.030 of an inch greater than the inside diameter of the bore 39.

With dimensions varied in the manner just mentioned, it sometimes happens that the conical surface of the ceramic member will reach the desired maximum diameter of ¼ inch shortly before reaching the rear end member (if its length is to be kept at ⅜ inch) so that the outer surface has a short cylindrical section at the rear end, instead of having the conical taper extend all the way to the rear end. Such a construction is illustrated in FIG. 2, where the ceramic member 31a has an outer frusto-conical face 33a throughout most of the axial length of the ceramic member, but for a short distance at the rear end of the member the outer surface becomes cylindrical as shown at 33b, rather than conical. For example, if the cone angle is 28 degrees and if the inside diameter of the wire guiding bore is 0.066 of an inch and the outside diameter of the front or small end is 0.096 of an inch, the frusto-conical surface 33a will have an axial length of about 0.309 of an inch, at which point the desired maximum diameter of 0.250 of an inch will be reached. From this point on rearwardly through the rest of the length of the ceramic member, its outer surface will be cylindrical as shown at 33b, through an axial length of 0.066 of an inch, assuming that the total axial length of the ceramic member is kept at 0.375 or ⅜ of an inch. Like the dimensions given in the first example, these dimensions are given merely by way of example and not as a limitation.

The construction shown in FIG. 2 functions in the same way as that in FIG. 1. Regardless of whether the outer surface is frusto-conical throughout its entire length (as in FIG. 1) or only through the major portion of its length and is followed by a short cylindrical surface (as in FIG. 2), in either event the entire outer surface is smooth and is entirely free of protuberances, flanges, or projections which present a hazard for chipping or breakage of the ceramic material. The entire length of the ceramic material except for the relatively short cylindrical rear end (if any) is wedged tightly into and very firmly embraced by the surrounding metal body 21, which thus serves to reinforce the ceramic material and effectively prevents breakage under normal operating conditions.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A wire guide for extruding machines, comprising a hollow metal body having walls forming a longitudinal channel through which wire travels from an entrance end to an exit end, the portion of said channel adjacent said exit end being in the form of a frustum of a cone with its smaller end at the exit end of the channel and with its larger end spaced rearwardly from said exit end, the channel extending cylindrically for a substantial distance rearwardly from said larger end of the frusto-conical portion, a guide member of hard wear-resistant ceramic material seated in the frusto-conical portion of said channel, said guide member having an outer surface which through at least the major portion of its length is of frusto-conical shape mating with and tightly engaged with the frusto-conical portion of said channel and having a central bore extending longitudinally through said guide member and adapted to serve as a guide for a wire travelling longitudinally through said bore, and a tubular metal sleeve extending longitudinally in the cylindrical portion of said channel and having a front end engaged with and pressing forwardly on the rear end of said ceramic guide member to hold said ceramic guide member tightly seated in the frusto-conical portion of the channel in said metal body, said ceramic guide member having its front end flush with the front end of said metal body, the frusto-conical portion of said channel in said metal body completely embracing and tightly and wedgingly encircling the entire area of the frusto-conical lateral surface of said ceramic guide member.

2. A construction as defined in claim 1, in which the outer surface of said ceramic material is of frusto-conical shape throughout its entire length.

3. A construction as defined in claim 1, in which the outer surface of said ceramic material is of frusto-conical shape throughout the major portion of its length and of cylindrical shape for a relatively short length at the large end of the frusto-conical portion, the cylindrical portion forming a smooth continuation of the frusto-conical portion and of the same diameter as the large end of the frusto-conical portion.

References Cited by the Examiner

UNITED STATES PATENTS

| | | | | |
|---|---|---|---|---|
| 1,393,860 | 10/1921 | Weeks | | 18—13 |
| 1,633,620 | 6/1927 | Alderfer | | 18—13 |
| 2,044,986 | 6/1936 | Horton | | 205—26 X |
| 2,636,923 | 4/1953 | Perzel | | 18—13 X |
| 2,899,054 | 8/1959 | Crentz | | 205—26 X |
| 2,979,414 | 4/1961 | Ryshkewitch | | 205—26 X |

FOREIGN PATENTS 223,886   4/1958   Australia.

WILLIAM J. STEPHENSON, *Primary Examiner*.

MICHAEL V. BRINDISI, *Examiner*.